(12) United States Patent
Ling (10) Patent No.: US 11,373,688 B2
(45) Date of Patent: Jun. 28, 2022

(54) METHOD AND DEVICE OF GENERATING COVER DYNAMIC PICTURES OF MULTIMEDIA FILES

(71) Applicant: Shanghai Bilibili Technology Co., LTD., Shanghai (CN)

(72) Inventor: Zhengxin Ling, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/032,421

(22) Filed: Sep. 25, 2020

(65) Prior Publication Data

US 2021/0098025 A1 Apr. 1, 2021

(30) Foreign Application Priority Data

Sep. 29, 2019 (CN) .......................... 201910936337.6

(51) Int. Cl.
*G11B 27/10* (2006.01)
*G11B 27/11* (2006.01)

(52) U.S. Cl.
CPC ............ *G11B 27/102* (2013.01); *G11B 27/11* (2013.01)

(58) Field of Classification Search
CPC ................................. G11B 27/02; G11B 27/11
See application file for complete search history.

(56) References Cited

U.S. PATENT DOCUMENTS

2016/0191975 A1* 6/2016 Ju ...................... H04N 21/4788
725/1
2020/0312375 A1* 10/2020 Xu ......................... G11B 27/34

* cited by examiner

*Primary Examiner* — Mishawn N. Hunter
(74) *Attorney, Agent, or Firm* — BakerHostetler (57) ABSTRACT

The present disclosure describes techniques for generating dynamic image covers of multimedia files. The disclosed techniques comprise obtaining a multimedia file and a plurality of comments associated with the multimedia file, wherein each of the plurality of comments corresponds to a time point of playing the multimedia file, and a duration of playing the multimedia file is divided into a plurality of time periods; determining a status corresponding to each of the plurality of time periods based on a subset of comments among the plurality of comments corresponding to each of the plurality of time periods; identifying at least one time period among the plurality of time periods based on determining that a status corresponding to the at least time period satisfies at least one predetermined rule; and generating a dynamic cover of the multimedia file based on images comprised in the multimedia file during the at least one time period.

17 Claims, 7 Drawing Sheets

I am in city A and it's sunny a congratulatory message from XX!

ha ha ha ha ha

XX is so funny, he lives on my funny spot

XX I love you high energy alert comment subset a

Fig. 5 ha ha ha ha ha xx is so funny, he lives on my funny spot

XX I love you high energy alert keyword comment set a

METHOD AND DEVICE OF GENERATING COVER DYNAMIC PICTURES OF MULTIMEDIA FILES

CROSS-REFERENCE TO RELATED APPLICATION

The present application claims priority of Chinese patent application filed on Sep. 29, 2019, with an application No. 201910936337.6 and a name "method and device of generating cover dynamic pictures of multimedia files". The entire content of the above-identified application is incorporated in the present application by reference.

BACKGROUND

With the development of technologies, a playing form of multimedia files has changed a lot, people can understand essence content of the multimedia files in advance through cover dynamic pictures of the multimedia files when browsing the multimedia files. In the related technology, creating over dynamic pictures of the multimedia files depend on manual operations.

SUMMARY

The embodiment of the present invention embodiment provides a method and a device of generating cover dynamic pictures of multimedia files to solve the problem of generating cover dynamic pictures depending on image frames manually captured by the operator in existing technology.

The specific technical scheme provided by the embodiment of the present invention is as below:

A method of generating cover dynamic pictures of multimedia files, the method includes: obtaining a multimedia file, and obtaining a comment set corresponding to the multimedia file;

dividing a play duration of the multimedia file into several time periods, and calculating comment status information of each time period respectively based on a corresponding relationship between each time period and each comment of the comment set;

screening out time periods whose comment status information meets a preset condition, and generating corresponding dynamic pictures respectively based on video pictures corresponding to each time period which are screened out;

selecting one dynamic picture from the dynamic pictures obtained as a cover dynamic picture of the multimedia file.

Optional, the calculating comment status information of any time period based on the corresponding relationship between each time period and each comment of the comment set, includes:

screening out a comment subset corresponding to the any time period from the comment set according to the corresponding relationship, to obtain an initial comment number of the comment subset:

matching comment contents of the comment subset with preset keywords to screen out comment which are successfully matched and obtain a keyword comment set, and determining a comment adjustment coefficient based on the keyword comment set:

adjusting the initial comment number by the comment adjustment coefficient to obtain a target comment number corresponding to the any time period;

obtaining the comment status information of the any time period based on the target comment number.

Optional, the determining a comment adjustment coefficient based on the keyword comment set, includes:

determining a number of additional comments corresponding to each keyword respectively according to a word type of each keyword:

summarizing a number of each additional comment to obtain a total number of the additional comments;

taking the total number of the additional comments as the comment adjustment coefficient;

the adjusting the initial comment number by the comment adjustment coefficient to obtain a target comment number corresponding to the any time period, including:

adding the comment adjustment coefficient to the initial comment number, a result obtained is the target comment number corresponding to the any time period.

Optional, the determining a comment adjustment coefficient based on the keyword comment set, includes:

determining an additional comment ratio corresponding to each keyword respectively according to a word type of each keyword;

calculating an average value of the additional comment ratio based on each additional comment ratio obtained;

taking the average value of the additional comment ratio as the comment adjustment coefficient;

the adjusting the initial comment number by the comment adjustment coefficient to obtain a target comment number corresponding to the any time period, including:

multiplying the comment adjustment coefficient by the initial comment number, a result obtained is the target comment number corresponding to the any time period.

Optional, the obtaining the comment status information of the any time period, includes:

taking the target comment number corresponding to the any time period as the comment status information of the any time period directly; or calculating a corresponding comment density coefficient based on the target comment number corresponding to the any time period and a time interval value corresponding to the any time period, and taking the comment density as the comment status information of the any time period.

Optional, the screening out time periods whose comment status information meets a preset condition, includes:

sorting the comment status information corresponding to each time period according to a value size, and screening out time periods corresponding to N comment status information with the maximum value, wherein N is a default natural number; or, comparing the comment status information corresponding to each time period with a set threshold, and screening out the time period whose value of the comment status information reaches the set threshold.

Optional, the selecting one dynamic picture from the dynamic pictures obtained as a cover dynamic picture of the multimedia file, includes:

selecting the dynamic picture corresponding to the time period with the maximum value of the comment status information as the cover dynamic picture of the multimedia file; or, sending each dynamic picture obtained to a background, selecting a dynamic picture according to an instruction of an administrator as the cover dynamic picture of the multimedia file.

A device of generating cover dynamic pictures of multimedia files, including:

an obtaining unit, obtaining a multimedia file, and obtaining a comment set corresponding to the multimedia file;

a calculating unit, dividing a play duration of the multimedia file into several time periods, and calculating comment status information of each time period respectively based on a corresponding relationship between each time period and each comment of the comment set;

a screening unit, screening out time periods whose comment status information meets a preset condition, and generating corresponding dynamic pictures respectively based on video pictures corresponding to each time period which are screened out;

a selecting unit, selecting one dynamic picture from the dynamic pictures obtained as a cover dynamic picture of the multimedia file.

Optional, when calculating comment status information of any time period based on the corresponding relationship between each time period and each comment of the comment set, the calculating unit;

screening out a comment subset corresponding to the any time period from the comment set according to the corresponding relationship, to obtain an initial comment number of the comment subset;

matching comment contents of the comment subset with preset keywords to screen out comment which are successfully matched and obtain a keyword comment set, and determining a comment adjustment coefficient based on the keyword comment set;

adjusting the initial comment number by the comment adjustment coefficient to obtain a target comment number corresponding to the any time period;

obtaining the comment status information of the any time period based on the target comment number.

Optional, when determining a comment adjustment coefficient based on the keyword comment set, the calculating unit further:

determining a number of additional comments corresponding to each keyword respectively according to a word type of each keyword;

summarizing a number of each additional comment to obtain a total number of the additional comments;

taking the total number of the additional comments as the comment adjustment coefficient;

the adjusting the initial comment number by the comment adjustment coefficient to obtain a target comment number corresponding to the any time period, including:

adding the comment adjustment coefficient to the initial comment number, a result obtained is the target comment number corresponding to the any time period.

Optional, when determining a comment adjustment coefficient based on the keyword comment set, the calculating unit further:

determining an additional comment ratio corresponding to each keyword respectively according to a word type of each keyword;

calculating an average value of the additional comment ratio based on each additional comment ratio obtained;

taking the average value of the additional comment ratio as the comment adjustment coefficient;

the adjusting the initial comment number by the comment adjustment coefficient to obtain a target comment number corresponding to the any time period, including:

multiplying the comment adjustment coefficient by the initial comment number, a result obtained is the target comment number corresponding to the any time period.

Optional, when obtaining the comment status information of the any time period, the calculating unit further:

taking the target comment number corresponding to the any time period as the comment status information of the any time period directly; or calculating a corresponding comment density coefficient based on the target comment number corresponding to the any time period and a time interval value corresponding to the any time period, and taking the comment density as the comment status information of the any time period.

Optional, when screening out time periods whose comment status information meets a preset condition, the screening unit:

sorting the comment status information corresponding to each time period according to a value size, and screening out time periods corresponding to N comment status information with the maximum value, wherein N is a default natural number; or, comparing the comment status information corresponding to each time period with a set threshold, and screening out the time period whose value of the comment.

Optional, when selecting one dynamic picture from the dynamic pictures obtained as a cover dynamic picture of the multimedia file, the selecting unit:

selecting the dynamic picture corresponding to the time period with the maximum value of the comment status information as the cover dynamic picture of the multimedia file; or, sending each dynamic picture obtained to a background, selecting a dynamic picture according to an instruction of an administrator as the cover dynamic picture of the multimedia file.

A server, including:

a memory, storing computer-readable instructions;

a processor, reading and executing the computer-readable instructions stored in the memory for implementing the steps of the method of generating cover dynamic pictures of multimedia files of any one of claims 1-7.

A storage medium, which causes a processor to implement the steps of the method of generating cover dynamic pictures of multimedia files above when instructions in the storage medium are executed by the processor.

The beneficial effects of the invention are as follows:

The present application provides a method and a device of generating cover dynamic pictures of multimedia files, obtaining a multimedia file and a comment set corresponding to the multimedia file, and dividing a play duration of the multimedia file into several time periods, and calculating comment status information of each time period respectively based on a corresponding relationship between each time period and each comment of the comment set, and then screening out time periods whose comment status information meets a preset condition, and generating corresponding dynamic pictures respectively based on video pictures corresponding to each time period which are screened out, at last, selecting one dynamic picture from the dynamic pictures obtained as a cover dynamic picture of the multimedia file. It can be seen that the method of generating cover dynamic pictures of multimedia files provided in the present application effectively solves the existing problem of generating the cover dynamic pictures by relying on manually captured image frames by the operator, which greatly reduces the labor cost, and improves the efficiency and quality of generating the cover dynamic pictures based on the screening of the comment status information, and makes it possible to display the essence of the multimedia file in the cover dynamic picture.

DETAILED DESCRIPTION OF ILLUSTRATIVE EMBODIMENTS

Generating dynamic image covers for multimedia files depends on interceptions of essence image frames in the multimedia files and configurations of the dynamic image covers, when using manual operations to generate dynamic image covers of the multimedia files, a lot of labor cost needs to be costly, and the image frames manually captured by the operator can cause efficiency of generating the cover dynamic pictures of the multimedia files very low, and it is impossible to guarantee that the cover dynamic pictures generated by the image frames which are captured by the operator can display the essence content of the multimedia files, which greatly affects users' preview effects.

To solve the problem of generating the cover dynamic pictures by relying on manually captured image frames by the operator in existing technology. The present application embodiment obtains a multimedia file (e.g., video) and a set of comments bullet screens corresponding to the multimedia file. The comments may be displayed with content of the multimedia file on the same screen. For example, the comments may be displayed in an overlay above the content. The comments may be animated when displayed. For example, the comments may be shown scrolling (e.g., from right to left, left to right, top to bottom, bottom to top) across the content, which may be referred to as "bullet screens." The present disclosure further divides a play duration of the multimedia file into several time periods, and then screens out time periods whose comment status information meets a preset condition based on the comment status information of each time period, and generates corresponding dynamic pictures respectively based on video pictures corresponding to the time period, at last, selects one dynamic picture from the dynamic pictures as a cover dynamic picture of the multimedia file.

The preferred embodiment of the present application will be further described in combination with drawings.

In the embodiment of the present application, multimedia files are uniformly managed by a server on the network side, wherein each multimedia file corresponds to a comment set, the comment set is composed of comment content commented by users when viewing the multimedia file, each comment content in the comment set is associated with a time point on a time axis of the multimedia file, and the time axis is a time system that video frames of the multimedia file are recorded serially according to a time sequence.

Figure 1:
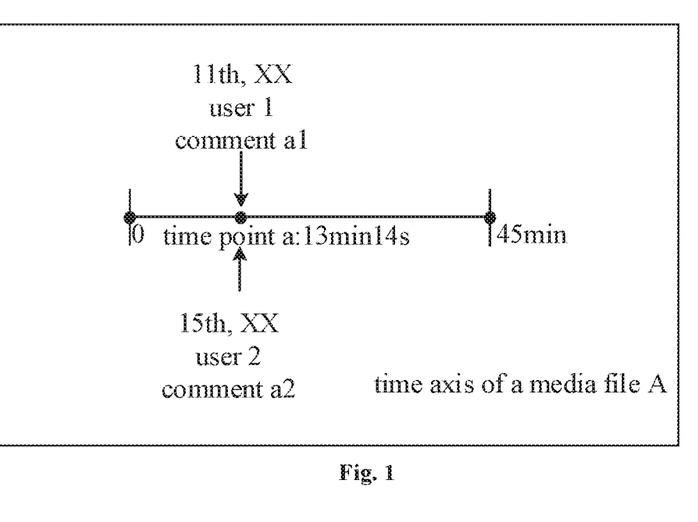
FIG. 1 is a corresponding schematic diagram of release time points of an embodiment of the present application.

For example, as shown in FIG. 1, taking a multimedia file A in multiple multimedia files managed by the server as an example, a total time length of a time axis of the multimedia file A corresponding to contents of the multimedia file A is 45 minutes, a comment a1 is released at a time point of a: 13:14 on the time axis when a user 1 watches the multimedia file A on the 11th of XX, and a comment a2 is released at the time point of a: 13:14 on the time axis when a user 2 watches multimedia file A on the 15th of XX, although time of the user 1 releasing comments and the user 2 releasing comments are different, time points on the time axis of the multimedia file A associated with the comment a1 and the comment a2 are the same, both of the time points are a time point a.

Figure 2:
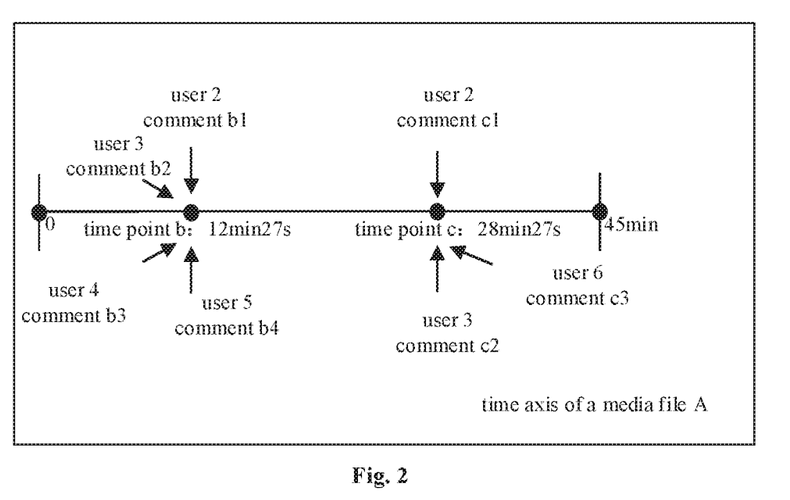
FIG. 2 is a schematic diagram of associated time points of comments in an embodiment of the present application.

For example again, as shown in FIG. 2, taking the multimedia file A in multiple multimedia files managed by the server as an example, the total time length of the time axis of the multimedia file A corresponding to the contents of the multimedia file A is 45 minutes, a user 2 releases a comment b1 and a comment c1 respectively at a time point b: 12:27 and a time point c: 28:27, a user 3 releases a comment b2 and a comment c2 respectively at the time point c: 28:27 and the time point c: 28:27, a user 4 releases comment b3 at the time point b: 12:27, a user 5 releases a comment b4 at the time point b: 12:27, and a user 6 releases a comment c3 at the time point c: 28:27, then the time point b: 12:27 on the time axis of the multimedia file A is associated with four comments, which are the comment b1, the comment b2, the comment b3, and the comment b4, and the time point c: 28:27 is associated with three comments, which are the comment c1, the comment c2, and the comment c3.

Figure 3:
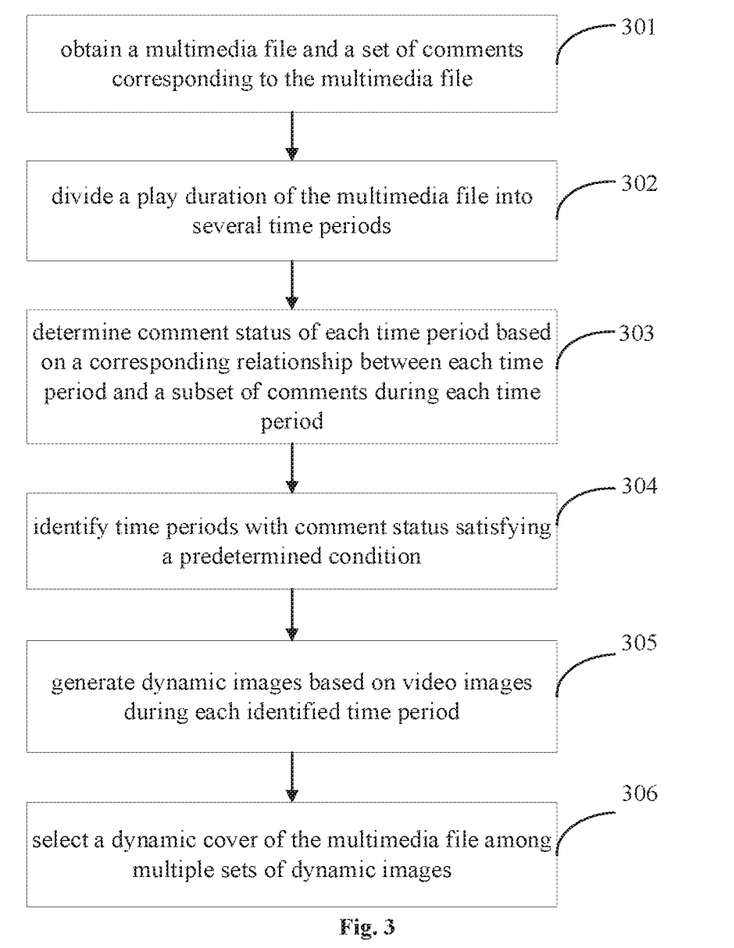
FIG. 3 is a flowchart of generating a cover dynamic picture of a multimedia file in an embodiment of the present application.

As shown in FIG. 3, in the embodiment of the present application, a detailed flowchart of generating cover dynamic pictures of multimedia files as below:

Step 301: the server obtains a multimedia file and a comment set corresponding to the multimedia file.

A server side obtains a multimedia file, specifically, multimedia file contents obtained include but are not limited to image frames, sounds, a time axis, and comment contents released by a user when the viewing the multimedia file. Wherein, the image frames and the sounds of multimedia files and the comment contents released by the user when viewing the multimedia file are all corresponding to specific time points on the time axis. At the same time, comment sets corresponding to multimedia files which are composed of the comment contents released by users when viewing the multimedia files also can be obtained, hereinafter referred to as the comment sets. Wherein, the comment contents released by the users when viewing the multimedia files correspond to time points on the time axis.

In addition, the multimedia files are re-obtained by the server according to preset update time of a system, so that the comment contents released by the users when viewing the multimedia files can be updated, so as to update the comment sets corresponding to the multimedia files.

Step 302: the server divides a play duration of the multimedia file into several time periods.

After the multimedia file is obtained, the server divides the play duration of the multimedia file into several time periods. Specifically, when the server divides the play duration of the multimedia file, time interval values corresponding to the time periods are configured according to the actual situation.

Figure 4:
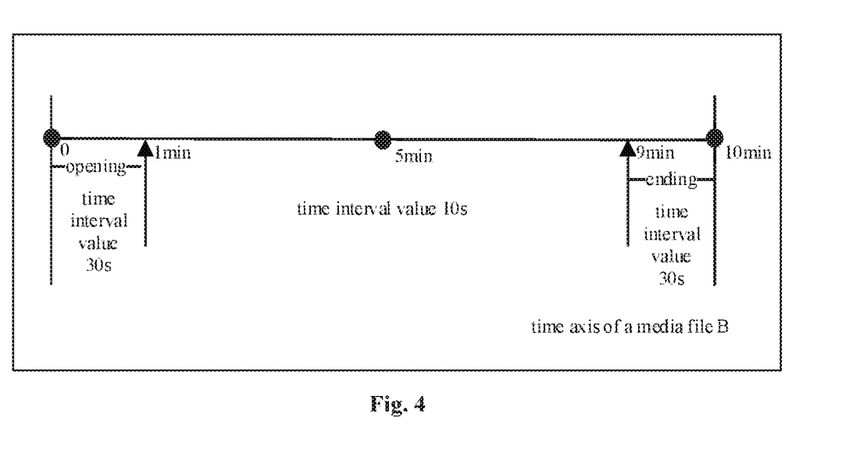
FIG. 4 is a time axis diagram of a multimedia file B in an embodiment of the present application.

For example, as shown in FIG. 4, for a multimedia file B obtained by the server, it can be known that a total time length of a time axis of the multimedia file B is 10 minutes, that is, the play duration of the multimedia file B is 10 minutes, and multimedia file contents between time point 0 and time point 1 min on the time axis of the multimedia file B are opening video, and multimedia file contents between the time point 1 min and time point 9 min on the time axis are video contents with plots, and multimedia file contents between 9 min on the time axis and 10 min on the time axis are ending video. Further, the server configures the time interval values corresponding to the time periods according to different video contents in different stages of multimedia file B, for example, configures according to the time interval value of 30 s at the opening video and the ending video, and configures according to the time interval value of 10 s at the video contents with plots. Therefore, the multimedia file B with a total time of 10 min can be divided into four time periods of 30 s and 48 time periods of 10 s.

A uniform time interval value can also be used to divide the play duration of the multimedia file, for example, a total play duration of the time axis of the multimedia file B is 10 minutes, that is, the play duration of the multimedia file B is 10 minutes. The video contents of different stages in the multimedia file B is not distinguished, the video contents are uniformly configured according to the time interval value of 10 s, then the multimedia file B can be divided into 60 time periods of 10 s. For the convenience of description, the play duration of the multimedia files is divided according to the uniform time interval value by default in the following instructions.

Step 303: the server calculates comment status information of each time period respectively based on a corresponding relationship between each time period and each comment of the comment set.

Specifically, the server divides the play duration of the multimedia file into several time periods, which can be represented as, the server divides the time axis into several time periods, and any time period on the time axis corresponds to a part of multimedia file contents, at the same time, the any time period on the time axis corresponds to a part of comments in the comment set, wherein, the time points associated with the part of comments are within the time periods on the time axis. According to the corresponding relationship, screening out a comment subset corresponding to the any time period from the comment set to obtain an initial comment number of the comment subset, wherein, the initial comment number is an actual comment number of the comment subset.

Further, matches comment contents of the comment subset with preset keywords to screen out comment which are successfully matched and obtain a keyword comment set, and determining a comment adjustment coefficient based on the keyword comment set. Specifically, keywords preset by the server include various word types, wherein, the word types of the keywords include but are not limited to: a lyric type, specifically such as 'XX I love you', 'XX accompanied my whole youth' and so on; a tease type, specifically such as 'ha ha ha' 'XX just lives on my funny spot' and so on; a praise type, specifically such as 'nice' "it's really great" and so on; a strong praise type, specifically such as "high energy alert", "famous scene", "the burst of acting" and so on.

Figure 5:
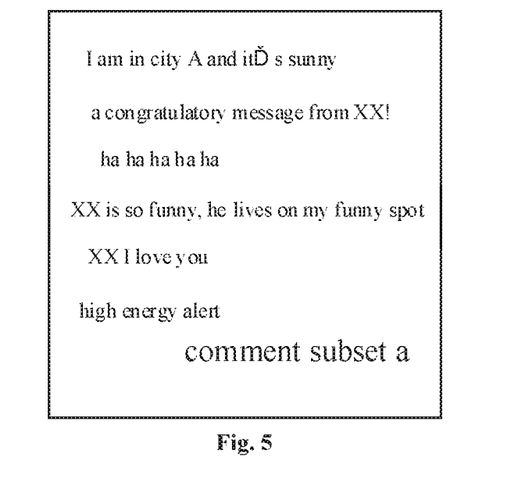
FIG. 5 is a content diagram of a comment subset a in an embodiment of the present application.
Figure 6:
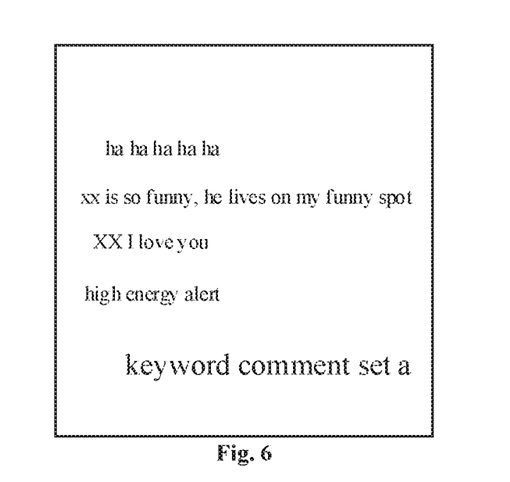
FIG. 6 is a content diagram of a keyword comment set a in an embodiment of the present application.

For example, as shown in FIG. 5 and FIG. 6, comment contents of a comment subset a include: 'I am in city A and it's sunny', 'a congratulatory message from XX', 'ha ha ha ha ha', 'XX is so funny, he lives on my funny spot', 'XX I love you' and 'high energy alert', a keyword comment set a is obtained as shown in FIG. 6 after matching with the preset keywords, the comment contents of the keyword comment set include: 'ha ha ha ha ha', 'xx is so funny, he lives on my funny spot', 'XX I love you' and 'high energy alert'.

Then the server determines a comment adjustment coefficient based on the keyword comment set, formation of the comment adjustment coefficient can specifically includes the following two ways:

First Way:

The server determines a number of additional comments corresponding to each keyword respectively according to a word type of each keyword, and then summarizes a number of each additional comment to obtain a total number of additional comments, and then takes the total number of the additional comments as the comment adjustment coefficient. Specifically, because of the keywords preset by the server have corresponding word types, the server configures corresponding number of the additional comments for various word types, wherein, the number of the additional comments is specially a number of additional comments set for various keywords, in addition, if there is a comment in the keyword comment set contains two keyword types, then the comment is processed according to the keyword type with a higher number of additional comments.

For example, it is supposed that the number of additional comments configured by the server for lyric type keywords in the keyword comment set is 3, the number of additional comments configured for tease type keywords is 5, the number of additional comments configured for praise type keywords is 12, and the number of additional comments configured for strong praise type keywords is 20. Then combined with FIG. 6, the total number of additional comment is 33 is obtained after summarizing the number of each additional comment in the keyword comment set shown in FIG. 6, that is, the adjustment coefficient of comment corresponding to the keyword comment set a which is shown in FIG. 6 is 33.

Further, the server adjusts the initial comment number with the comment adjustment coefficient to obtain a target comment number corresponding to the any time period, specifically, the server adds the comment adjustment coefficient to the initial comment number, a result obtained is the target comment number corresponding to the any time period. Wherein, the initial comment number is an actual comment number of the comment subset corresponding to the any time period.

For example, as shown in FIG. 5 and FIG. 6, FIG. 5 is the comment subset a corresponding to a certain time period, and the initial comment number of the comment subset a is 6, after screening the comment subset a in FIG. 5, the keyword comment set a shown in FIG. 6 is obtained, the comment adjustment coefficient corresponding to the key word comment set is 33 after calculating, then the server adds the initial comment number to the comment adjustment coefficient, and a target comment number corresponding to a certain time period is obtained, so the target comment number is 39.

Second Way:

The server determines an additional comment ratio corresponding to each keyword respectively according to a word type of each keyword, calculates an average value of the additional comment ratio based on each additional comment ratio obtained, and takes the average value of the additional comment ratio as the comment adjustment coefficient. Specifically, because of the keywords preset by the server have corresponding word types, the server configures corresponding additional comment ratio for various word types, wherein, the additional comment ratio is specifically a proportion value set for various keywords, which is used to measure the effect of the keyword comment on total number of comments. In addition, if a comment in the keyword comment set contains two keyword types, the comment will be processed according to the keyword type with a higher additional comment ratio.

Figure 7:
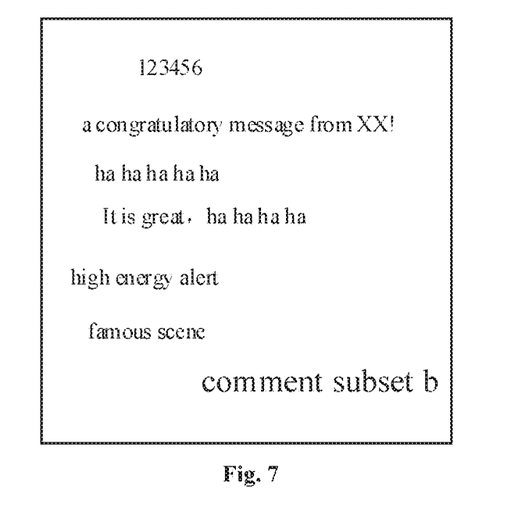
FIG. 7 is a content diagram of a comment subset b in an embodiment of the present application.
Figure 8:
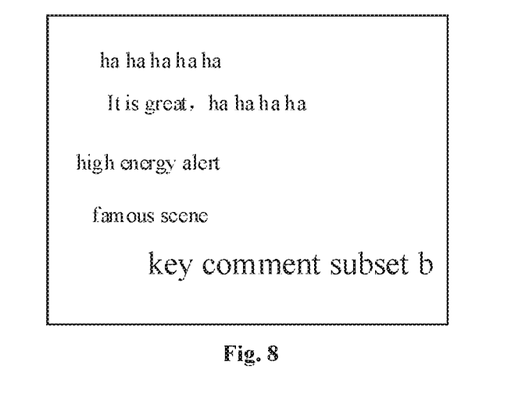
FIG. 8 is a content diagram of a keyword comment set b in an embodiment of the present application.

For example, it is supposed that the additional comment ratio configured by the server for lyric type keywords in the keyword comment set is 2, the additional comment ratio configured for tease type keywords is 5, the additional comment ratio configured for praise type keywords is 10, and the additional comment ratio configured for strong praise type keywords is 15. Then combined with FIG. 7 and FIG. 8, an initial comment number in FIG. 7 is 6, a keyword comment set b as shown in FIG. 8 is obtained after screening by the server, wherein, the server can calculate an average value of the additional comment ratio is 11.25 based on each additional comment ratio obtained. The server takes the average value of the additional comment ratio as the comment adjustment coefficient, that is, the comment adjustment coefficient corresponding to the keyword comment set b shown in FIG. 8 is 11.25.

Further, the server adjusts the initial comment number by the comment adjustment coefficient to obtain a target comment number corresponding to the any time period, specifically, the server multiplies the comment adjustment coefficient by the initial comment number, a result obtained is the target comment number corresponding to the any time period.

For example, referring to FIG. 7 and FIG. 8, FIG. 7 is a comment subset corresponding to a certain time period, and the initial comment number of the comment subset is 6, after screening the comment subset in FIG. 7 the keyword comment set shown in FIG. 8 is obtained, the comment adjustment coefficient corresponding to the keyword comment set is 11.25 after calculating, then the server multiplies the comment adjustment coefficient by the initial comment number, the target comment number corresponding to the certain time period is obtained, so the target comment number is 67.5.

Further, the server obtains the comment status information of the any time period based on the target comment number, specifically, the server can take the target comment number corresponding to the any time period as the comment status information of the any time period directly.

For example, in the first way mentioned above, the target comment number corresponding to a certain time period calculated by the server is 39 by combining the comment subset a corresponding to the certain time period in FIG. 5 and the keyword comment set a obtained in FIG. 6 after screening.

Or, the server can calculate a corresponding comment density coefficient based on the target comment number corresponding to the any time period and the time interval value corresponding to the any time period, and take the comment density coefficient as the comment status information of the any time period.

For example, the target comment number corresponding to a certain time period described in FIG. 5 calculated in the first way mentioned is 39, it is supposed that the time interval value of the certain time period is 10 s, the comment density coefficient of the certain time period is 3.9 can be obtained after calculating by the server.

Step 304: the server screens out time periods whose comment status information meets a preset condition.

Specifically, the server sorts the comment status information corresponding to each time period according to value sizes, screens time periods corresponding to N comment status information with the maximum value, wherein N is a default natural number. In addition, the comment state information of a time period can be the target comment number corresponding to the time period or the comment density coefficient corresponding to the time period, for the convenience of description, the following only takes the target comment number corresponding to a time period as the comment state information of the time period as an example for specific description.

For example, it is supposed that the server sets a value of N to 4, and now it is known that comment status information corresponding to a time period a is 39, comment status information corresponding to a time period b is 45, comment status information corresponding to a time period C is 56, comment status information corresponding to a time period d is 25, comment status information corresponding to a time period e is 78, comment status information corresponding to a time period f is 50, and comment status information corresponding to a time period g is 77, and sequence of time periods mentioned above can be sorted according to the comment state status information is, the time period e, the time period g, the time period c, the time period f, the time period b, the time period a and the time period d, due to the value of N is 4, the time periods that the comment status information screened by the server meets the preset condition are the time period e, the time period g and the time interval c, and the time interval f in turn.

Or, the server can compare the comment status information corresponding to each time period with a set threshold, and screen out the time period whose value of the comment status information reaches the set threshold. In addition, the comment status information of a time period can be the target comment number corresponding to the time period or the comment density coefficient corresponding to the time period, for the convenience of description, the following only takes the comment density coefficient corresponding to a time period as the comment status information of the time period directly to be an example for specific description.

For example, it is supposed that the set threshold value configured by the server is 15, it is known that comment status information corresponding to a time period a1 is 11.25 comment status information corresponding to a time period b1 is 13.76, comment status information corresponding to a time period c1 is 15.72, comment status information corresponding to a time period d1 is 17, comment status information corresponding to a time period e1 is 9.6, and comment status information corresponding to a time period f1 is 20.27, comment status information corresponding to a time period g1 is 17.7, then after the time period involved above is compared with the set threshold according to the comment status information, time periods that the value of the comment status information reaches the set threshold is screened out by the server, which are the time period c1, the time period d1, the time period f1, and the time period g1 in turn.

Step 305: the server generates corresponding dynamic pictures respectively based on video pictures corresponding to each time period which are screened out.

Specifically, after the time periods whose comment status information meets the preset condition are screened out by the server, corresponding dynamic pictures are generated respectively according to the video pictures corresponding to the time periods, wherein, generating corresponding dynamic pictures by using video picture segments is a mature technology under the existing technology, and will not be described here.

Step 306: the server selects one dynamic picture from the dynamic pictures obtained as a cover dynamic picture of the multimedia file.

Specifically, the server can select the dynamic pictures corresponding to the time period with the maximum value of the comment information as the cover dynamic picture of the multimedia file, in the step 303 above, the comment status information of a certain time period can be the target comment number corresponding to the certain time period has been stated, or the comment density coefficient of a certain time period, for the convenience of description, only the case that the target comment number is taken as the comment status information will be described in detail below, the case that the comment density coefficient is taken as the comment status information is similar to this, and will not be described here.

For example, it is supposed that after a multimedia file is processed by the server, the time periods screened out are: the time period e, the corresponding comment status information is 78, the time period g, the corresponding comment status information is 77, the time period c, the corresponding comment status information is 56, the time period f, and the corresponding comment status information is 50. The server selects a dynamic picture corresponding to the time period e with the maximum value of the comment status information as the cover dynamic picture of the multimedia file.

Or, the server can send the dynamic picture obtained to the background, and a dynamic picture is selected according to an instruction of the administrator as the cover dynamic picture of the multimedia file. Specifically, after the multimedia file is processed, the server generates the corresponding dynamic picture according to video segments corresponding to the time periods screened out, and then the server sends the dynamic picture to the background where the administrator is located, and selects a dynamic picture according to an operation instruction of the administrator, and finally serves as the cover dynamic picture of the multimedia file.

Figure 9:
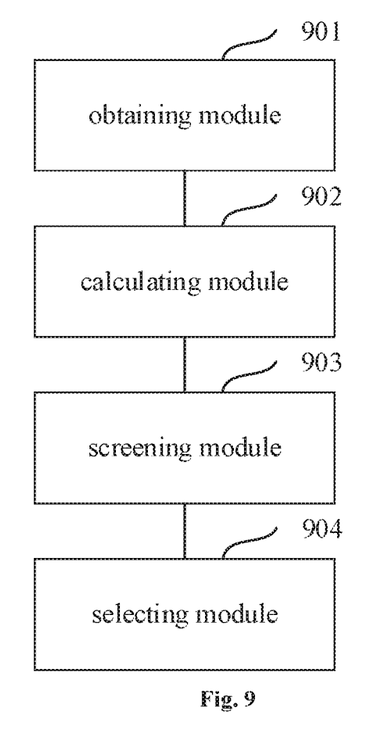
FIG. 9 is a logical structure diagram of a server in an embodiment of the present application.

Based on the above embodiment, referring to FIG. 9, in the embodiment of the application, the server at least includes:

an obtaining unit 901, obtaining a multimedia file, and obtaining a comment set corresponding to the multimedia file;

a calculating unit 902, dividing a play duration of the multimedia file into several time periods, and calculating comment status information of each time period respectively based on a corresponding relationship between each time period and each comment of the comment set;

a screening unit 903, screening out time periods whose comment status information meets a preset condition, and generating corresponding dynamic pictures respectively based on video pictures corresponding to each time period which are screened out:

a selecting unit 904, selecting one dynamic picture from the dynamic pictures obtained as a cover dynamic picture of the multimedia file.

When calculating comment status information of any time period based on the corresponding relationship between each time period and each comment of the comment set, the calculating unit 902:

screening out a comment subset corresponding to the any time period from the comment set according to the corresponding relationship, to obtain an initial comment number of the comment subset;

matching comment contents of the comment subset with preset keywords to screen out comment which are successfully matched and obtain a keyword comment set, and determining a comment adjustment coefficient based on the keyword comment set:

adjusting the initial comment number by the comment adjustment coefficient to obtain a target comment number corresponding to the any time period;

obtaining the comment status information of the any time period based on the target comment number.

When determining a comment adjustment coefficient based on the keyword comment set, the calculating unit 902 further:

determining a number of additional comments corresponding to each keyword respectively according to a word type of each keyword;

summarizing a number of each additional comment to obtain a total number of the additional comments;

taking the total number of the additional comments as the comment adjustment coefficient;

the adjusting the initial comment number by the comment adjustment coefficient to obtain a target comment number corresponding to the any time period, includes:

adding the comment adjustment coefficient to the initial comment number, a result obtained is the target comment number corresponding to the any time period.

When determining a comment adjustment coefficient based on the keyword comment set, the calculating unit 902 further:

determining an additional comment ratio corresponding to each keyword respectively according to a word type of each keyword, calculating an average value of the additional comment ratio based on each additional comment ratio obtained;

taking the average value of the additional comment ratio as the comment adjustment coefficient:

the adjusting the initial comment number by the comment adjustment coefficient to obtain a target comment number corresponding to the any time period, includes:

multiplying the comment adjustment coefficient by the initial comment number, a result obtained is the target comment number corresponding to the any time period.

When obtaining the comment status information of the any time period, the calculating unit 902 further:

taking the target comment number corresponding to the any time period as the comment status information of the any time period directly; or, calculating a corresponding comment density coefficient based on the target comment number corresponding to the any time period and a time interval value corresponding to the any time period, and taking the comment density as the comment status information of the any time period.

When screening out time periods whose comment status information meets a preset condition, the screening unit 903:

sorting the comment status information corresponding to each time period according to a value size, and screening out time periods corresponding to N comment status information with the maximum value, wherein N is a default natural number; or, comparing the comment status information corresponding to each time period with a set threshold, and screening out the time period whose value of the comment status information reaches the set threshold.

When selecting one dynamic picture from the dynamic pictures obtained as a cover dynamic picture of the multimedia file, the selecting unit 904:

selecting the dynamic picture corresponding to the time period with the maximum value of the comment status information as the cover dynamic picture of the multimedia file; or, sending each dynamic picture obtained to the background, selecting a dynamic picture according to an instruction of an administrator, as the cover dynamic picture of the multimedia file.

Figure 10:
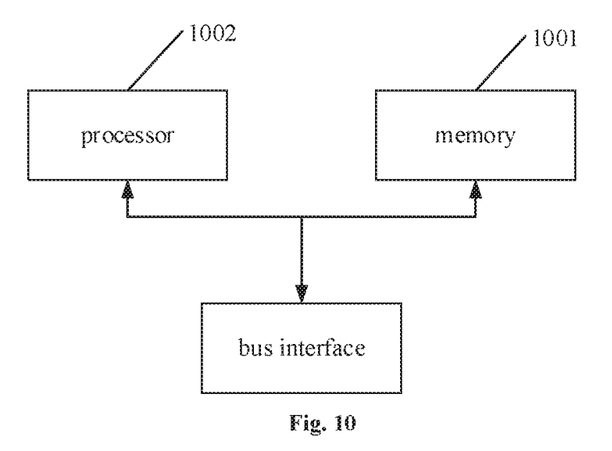
FIG. 10 is an entity structure diagram of the server in an embodiment of the present application.

Based on the same application concept, as shown in FIG. 10, a server is provided in the embodiment of the present application, the server at least includes a memory 1001 and a processor 1002, wherein, the memory 1001, storing computer-readable instructions;

the processor 1002, reading and executing the computer-readable instructions stored in the memory for implementing the steps of any of the method of generating cover dynamic pictures of multimedia files mentioned above.

Based on the same application concept, a computer-readable storage medium is provided in the embodiment of the present application, which causes the processor to implement the steps of any of the method of generating cover dynamic pictures of multimedia files mentioned above when the instructions in the storage medium are executed by the processor.

To summarize, the embodiment of the present application provides a method and a device of generating cover dynamic pictures of multimedia files, obtaining a multimedia file and a comment set corresponding to the multimedia file, and dividing a play duration of the multimedia file into several time periods, and calculating comment status information of each time period respectively based on a corresponding relationship between each time period and each comment of the comment set, and then screening out time periods whose comment status information meets a preset condition, and generating corresponding dynamic pictures respectively based on video pictures corresponding to each time period which are screened out, at last, selecting one dynamic picture from the dynamic pictures obtained as a cover dynamic picture of the multimedia file. It can be seen that the method of generating cover dynamic pictures of multimedia files provided in the present application effectively solves the existing problem of generating the cover dynamic pictures by relying on manually captured image frames by the operator, which greatly reduces the labor cost, and improves the efficiency and quality of generating the cover dynamic pictures based on the screening of the comment status information, and makes it possible to display the essence of the multimedia file in the cover dynamic picture.

The person skilled in the art should appreciate that embodiments of the present application may be provided as a method, a system, or a computer program product. Therefore, the present application may take a form of a complete hardware embodiment, a complete software embodiment, or an embodiment of combining software and hardware. Moreover, the present application can adopt a form of a computer program product implemented on one or more computer available storage multimedia (including but not limited to disk memory, CD-ROM, optical memory, etc.) including computer available program codes.

The present application is described with reference to a flow chart and/or block diagram of a method, a device (system), and a computer program product flow chart and/or block diagram. It should be understood that each flow and/or block in the flow chart and/or the block diagram and the combination of flow and/or block in the flow chart and/or block diagram can be realized by computer program instructions. These computer program instructions can be provided to a general-purpose computer, a special-purpose computer, an embedded processor or a processor of other programmable data processing equipment to generate a machine, so that the instructions executed by a processor of a computer or other programmable data processing device can be used to realize a function specified a process or more processes of a flow chart and/or a block or more blocks of a block diagram.

These computer program instructions can also be stored in a computer-readable memory that can guide a computer or other programmable data processing device to work in a specific way, so that the instructions stored in the computer-readable memory generate a manufacturing product including an instruction device, and the instruction device implements a specified function in a process or more processes of a flow chart and/or a block or a block chart or more blocks.

These computer program instructions can also be loaded on a computer or other programmable data processing device, so that a series of operation steps can be executed on the computer or other programmable device to generate a computer implemented process, so that the instructions executed on the computer or other programmable device are provided for realizing steps of a specified function in a process or more processes of a flow chart and/or a block or a block chart or more blocks.

Although preferred embodiments of the present application have been described, the person skilled in the art may make additional changes and modifications to these embodiments once they have learned the basic inventive concepts. Therefore, the appended claims are intended to be interpreted to include preferred embodiments and all changes and modifications falling within the scope of the invention.

Obviously, the person skilled in the art can make various changes and modifications to the embodiments of the present application without departing from the spirit and scope of the embodiments of the present application. Thus, if these modifications and variations of the embodiments of the present application fall within the scope of the claims of the present application and its equivalent technology, the present application also intends to include these modifications and variations.

What is claimed is:

1. A method of generating dynamic image covers of multimedia files, comprising:

obtaining a multimedia file and a plurality of comments associated with the multimedia file, wherein each of the plurality of comments corresponds to a time point of playing the multimedia file, and a duration of playing the multimedia file is divided into a plurality of time periods;

determining a status corresponding to each of the plurality of time periods based on a subset of comments corresponding to each of the plurality of time periods, the subset of comments being among the plurality of comments;

identifying at least one time period among the plurality of time periods based on determining that a status corresponding to the at least time period satisfies at least one predetermined rule;

generating a dynamic cover of the multimedia file based on images comprised in the multimedia file during the at least one time period;

wherein the method further comprises:

determining a target number corresponding to each of the plurality of time periods based at least in part on a number of comments included in the subset of comments corresponding to each of the plurality of time periods;

determining a density coefficient based on the target number corresponding to each of the plurality of time periods and a time length of a corresponding time period; and wherein the status corresponding to each of the plurality of time periods comprises a value equal to the target number or the density coefficient corresponding to each of the plurality of time periods.

2. The method of claim 1, wherein the determining a status of each of the plurality of time periods based on a subset of comments corresponding to each of the plurality of time periods further comprises:

determining the number of comments included in the subset of comments corresponding to each of the plurality of time periods;

determining a coefficient based at least in part on comparing each of the subset comments with a plurality of predetermined keywords;

adjusting the number of comments using the coefficient to obtain the target number corresponding to each of the plurality of time periods; and determining the status corresponding to each of the plurality of time periods based on the target number.

3. The method of claim 2, wherein the determining a coefficient based at least in part on comparing each of the subset comments with a plurality of predetermined keywords further comprises:

determining one or more comments among the subset of comments each of which comprises at least one keyword among the plurality of predetermined keywords;

determining a type of the at least one keyword included in each of the one or more comments; and determining the coefficient based on the type of the at least one keyword included in each of the one or more comments.

4. The method of claim 3, further comprising:

determining a number of additional comments based on the type of the at least one keyword included in each of the one or more comments; and determining the target number corresponding to each of the plurality of time periods by adding the number of additional comments to the number of comments in the subset of comments.

5. The method of claim 3, further comprising:

determining a ratio based on the type of the at least one keyword included in each of the one or more comments; and multiplying the number of comments in the subset of comments by the ratio to obtain the target number corresponding to each of the plurality of time periods.

6. The method of claim 1, wherein the at least one time period comprises two or more time periods among the plurality of time periods, and two or more sets of dynamic images are generated based on images included during the two or more time periods, respectively.

7. The method of claim 6, further comprising:

determining the dynamic cover of the multimedia file among the two or more sets of dynamic images based on status values corresponding to the two or more time periods, the dynamic cover of the multimedia file corresponding to a time period with a maximum value among the status values corresponding to the two or more time periods.

8. A system of generating dynamic image covers of multimedia files, comprising:

at least one processor; and at least one memory communicatively coupled to the at least one processor and storing instructions that upon execution by the at least one processor cause the system to:

obtain a multimedia file and a plurality of comments associated with the multimedia file, wherein each of the plurality of comments corresponds to a time point of playing the multimedia file, and a duration of playing the multimedia file is divided into a plurality of time periods;

determine a status corresponding to each of the plurality of time periods based on a subset of comments corresponding to each of the plurality of time periods, the subset of comments being among the plurality of comments;

identify at least one time period among the plurality of time periods based on determining that a status corresponding to the at least time period satisfies at least one predetermined rule;

generate a dynamic cover of the multimedia file based on images comprised in the multimedia file during the at least one time period;

wherein at least one memory further storing instructions that upon execution by the at least one processor cause the system to:

determine a target number corresponding to each of the plurality of time periods based at least in part on a number of comments included in the subset of comments corresponding to each of the plurality of time periods;

determine a density coefficient based on the target number corresponding to each of the plurality of time periods and a time length of a corresponding time period; and wherein the status corresponding to each of the plurality of time periods comprises a value equal to the target number or the density coefficient corresponding to each of the plurality of time periods.

9. The system of claim 8, the at least one memory further storing instructions that upon execution by the at least one processor cause the system to:

determine the number of comments included in the subset of comments corresponding to each of the plurality of time periods;

determine a coefficient based at least in part on comparing each of the subset comments with a plurality of predetermined keywords;

adjust the number of comments using the coefficient to obtain the target number corresponding to each of the plurality of time periods; and determine the status corresponding to each of the plurality of time periods based on the target number.

10. The system of claim 9, the at least one memory further storing instructions that upon execution by the at least one processor cause the system to:

determine one or more comments among the subset of comments each of which comprises at least one keyword among the plurality of predetermined keywords;

determine a type of the at least one keyword included in each of the one or more comments; and determine the coefficient based on the type of the at least one keyword included in each of the one or more comments.

11. The system of claim 8, wherein the at least one time period comprises two or more time periods among the plurality of time periods, and two or more sets of dynamic images are generated based on images included during the two or more time periods, respectively.

12. The system of claim 11 the at least one memory further storing instructions that upon execution by the at least one processor cause the system to:
determine the dynamic cover of the multimedia file among the two or more sets of dynamic images based on status values corresponding to the two or more time periods, the dynamic cover of the multimedia file corresponding to a time period with a maximum value among the status values corresponding to the two or more time periods.

13. A non-transitory computer-readable storage medium, storing computer-readable instructions that upon execution by a processor cause the processor to implement operations comprising:
obtaining a multimedia file and a plurality of comments associated with the multimedia file, wherein each of the plurality of comments corresponds to a time point of playing the multimedia file, and a duration of playing the multimedia file is divided into a plurality of time periods;
determining a status corresponding to each of the plurality of time periods based on a subset of comments corresponding to each of the plurality of time periods, the subset of comments being among the plurality of comments;
identifying at least one time period among the plurality of time periods based on determining that a status corresponding to the at least time period satisfies at least one predetermined rule;
generating a dynamic cover of the multimedia file based on images comprised in the multimedia file during the at least one time period;
wherein the operations further comprise:
determining a target number corresponding to each of the plurality of time periods based at least in part on a number of comments included in the subset of comments corresponding to each of the plurality of time periods;
determining a density coefficient based on the target number corresponding to each of the plurality of time periods and a time length of a corresponding time period; and
wherein the status corresponding to each of the plurality of time periods comprises a value equal to the target number or the density coefficient corresponding to each of the plurality of time periods.

14. The non-transitory computer-readable storage medium of claim 13, the operations further comprising:
determining the number of comments included in the subset of comments corresponding to each of the plurality of time periods;
determining a coefficient based at least in part on comparing each of the subset comments with a plurality of predetermined keywords;
adjusting the number of comments using the coefficient to obtain the target number corresponding to each of the plurality of time periods; and
determining the status corresponding to each of the plurality of time periods based on the target number.

15. The non-transitory computer-readable storage medium of claim 14, the operations further comprising:
determining one or more comments among the subset of comments each of which comprises at least one keyword among the plurality of predetermined keywords;
determining a type of the at least one keyword included in each of the one or more comments; and
determining the coefficient based on the type of the at least one keyword included in each of the one or more comments.

16. The non-transitory computer-readable storage medium of claim 13, wherein the at least one time period comprises two or more time periods among the plurality of time periods, and two or more sets of dynamic images are generated based on images included during the two or more time periods, respectively.

17. The non-transitory computer-readable storage medium of claim 16, the operations further comprising:
determining the dynamic cover of the multimedia file among the two or more sets of dynamic images based on status values corresponding to the two or more time periods, the dynamic cover of the multimedia file corresponding to a time period with a maximum value among the status values corresponding to the two or more time periods.

* * * * *